June 3, 1969

C. E. WEST 3,447,815

BOAT-CENTERING APPARATUS

Filed May 1, 1967

INVENTOR.
CLARK E. WEST
BY
Paul B. Fike
PATENT AGENT

United States Patent Office 3,447,815
Patented June 3, 1969

3,447,815
BOAT-CENTERING APPARATUS
Clark E. West, 2413 Forbes Ave.,
Santa Clara, Calif. 95050
Filed May 1, 1967, Ser. No. 634,971
Int. Cl. B60p *3/10;* B62d *33/08, 53/04*
U.S. Cl. 280—144      2 Claims

ABSTRACT OF THE DISCLOSURE

Boat-centering apparatus for a boat trailer including a pair of boat engaging members pivotally mounted on opposite sides of the boat trailer and arranged to engage the sides of the boat being loaded thereon, these boat engaging members being operatively interconnected by a connecting linkage including a single spring which urges both members inwardly toward the sides of the boat being loaded.

---

The present invention relates generally to boat trailers and more particularly to a boat-centering apparatus which can be mounted on a boat trailer to automatically assure precise centering of the boat on such trailer.

Boating enthusiasts have frequently experienced the difficulties encountered when an attempt is made to load a boat onto a trailer therefor. Although the trailer itself is relatively stable, the boat frequently drifts during the loading operation and comes to rest on the trailer in a non-aligned, non-centered position, and removal and subsequent re-loading becomes necessary. Somewhat ineffective, abortive attempts have been made to cure this problem through the expedient of using upstanding arms at the sides and rear of the boat trailer, but these have been rigid structures which, of necessity, must be positioned a considerable distance from the sides of the boat whose beam obviously varies at different longitudinal positions.

Accordingly, it is a general object of the present invention to provide a boat-centering apparatus which can be readily mounted on substantially any type of boat trailer to maintain contact with the sides of the boat during the loading operation so as to assure a centered disposition thereof on the trailer.

More particularly, it is a feature of the invention to provide a boat-centering apparatus incorporating a considerable amount of adjustability so as to be utilizable with a rather wide variety of boat trailers and boats to be loaded thereon.

It is yet a further feature of the invention to provide a boat-centering apparatus which can be mounted on a boat trailer and which includes a pair of members arranged to engage a boat on opposite sides thereof so as to resiliently urge the boat to a centered disposition.

A related feature of the invention relates to the arrangement interconnecting the boat-engaging members which positively assures that both members remain equi-distant from a centering plane.

Figure 1:
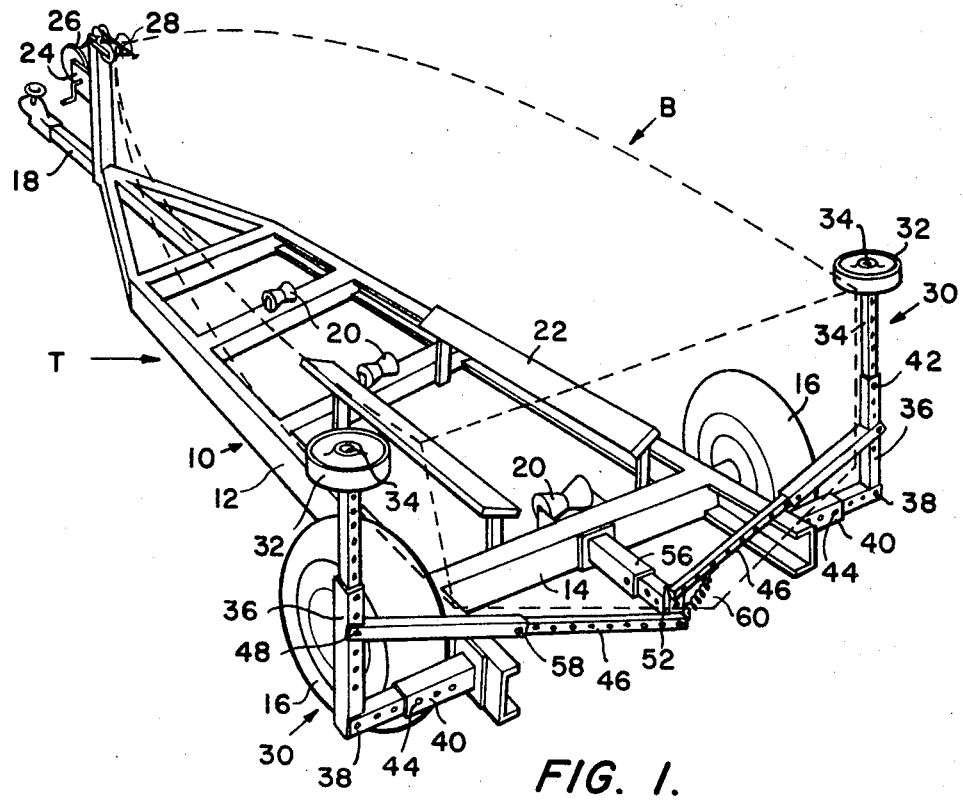
Figure 2:
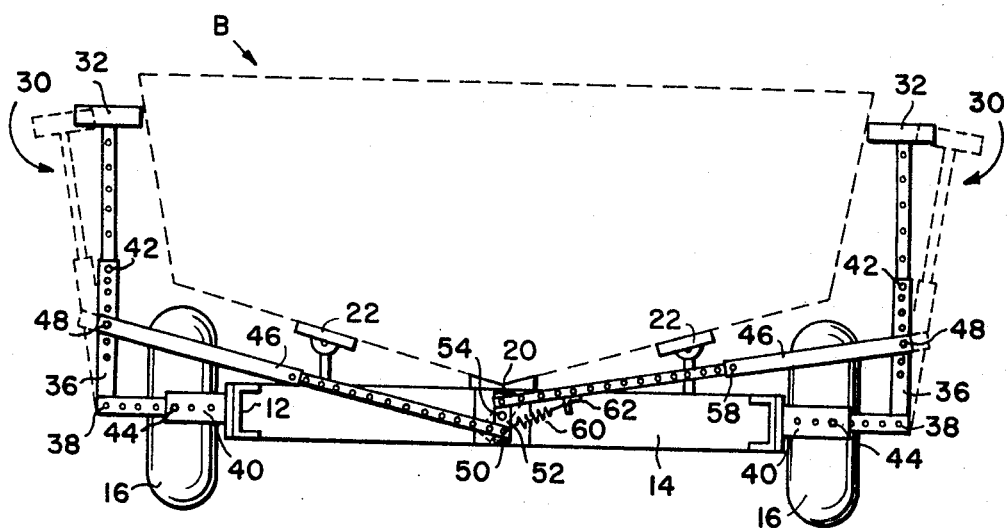

These as well as other objects and features of the invention will become more apparent from a perusal of the following description of an exemplary embodiment of the invention as shown in the accompanying drawing wherein:

FIG. 1 is a perspective view of a boat trailer with the boat-centering apparatus mounted thereon, and FIG. 2 is an enlarged rear elevational view of the boat trailer diagrammatically illustrating the operation of the centering apparatus thereon.

With initial reference to FIG. 1, a generally conventional boat trailer T is illustrated including an elongated frame 10 having suitable longitudinal and transverse frame members 12, 14, the frame being supported adjacent its rear sides by a pair of wheels 16 and having a tongue 18 projecting from its forward end for appropriate connection to a conventional trailer hitch on an automobile. For support of a boat B, as indicated in phantom lines in FIG. 1, a plurality of longitudinally-centered rollers 20 are mounted from the frame 10 and laterally-positioned stabilizing struts 22 are adapted to engage the under surface of the boat. In turn, at the forward end, a standard 24 supports a cable reel 26, the cable 28 being connected in a conventional fashion to an eyelet at the forward end of the boat, this arrangement assisting loading of the boat B onto the trailer T.

Although shown only in phantom lines, the boat B is of a typical variety whose beam is greater at a point amidships than it is at its bow of stern. The centering apparatus which generally is mounted at the rear of the described trailer T is arranged to accommodate this variance in beam dimensions as the boat is loaded and thus to maintain its centered disposition on the supporting rollers 20 and struts 22 as the boat B is moved onto the trailer and thereafter resiliently maintain the boat in its centered disposition during transport.

With continued reference to FIG. 1 and additional reference to FIG. 2, the boat-centering apparatus includes a pair of like members generally indicated at 30 which are mounted above the sides of the trailer frame 10 adjacent its rear end for lateral movement into engagement with the sides of a boat B on the trailer T. More particularly, the boat-engaging members 30 constitute rubber-covered rollers 32 mounted for rotation about stub shafts 34 projecting from the upper ends of like arms 36. Each arm 36 is composed of two sections of tubing, the uppermost of which is telescopically received in the lower tubing section, thus to provide for extensibility of each arm. At its lower end, each arm 36 is pivoted about a pivot pin 38 disposed generally longitudinally of the trailer frame 10, such pivot being supported at the outer extremity of a laterally extending bracket 40 whose inner end is bolted or otherwise secured to one of the longitudinal members 12 of the trailer frame 10. Preferably, as shown, this lateral bracket 40 is also formed by two telescopically connected tubing sections so that the lateral disposition of the arm 36 can be varied, thus to enable accommodation of boats of different beam dimensions. In both the extensible arm and the extensible bracket 40, a plurality of holes are formed in the tubular members to enable insertion of a bolt 42, 44 to hold the extensible members in the desired adjusted positions.

The two upstanding arms 36 on opposite sides of the boat trailer T are interconnected by means which automatically assures that both arms and more particularly, the boat-engaging rollers 32 at the upper ends thereof, are maintained equi-distant from a central vertical plane through the longitudinal central axis of the boat trailer T. Preferably, such means take the form of like extensible connecting rods 46, one end of each rod being pivotally joined by a pivot pin 48 to the respective upstanding arm 36 and its other end being joined by a parallel pivot pin 50 to one extremity of a lever 52 which is centrally pivoted about a pin 54 projecting rearwardly from an extensible bracket 56 that is mounted at its forward extremity by bolts or other suitable means to a transverse frame member 14 of the trailer. To provide the mentioned extensibility, each of the connecting rods 46 is formed by telescopic tubing sections provided with a plurality of apertures like those of the arms 36 and arm-mounting brackets 40 and a suitable bolt 58 is used to secure each connecting rod in its adjusted length.

Since one rod 46 is connected at its inner end to the lower end of the central lever 52, the other rod is connected to the upper end of such lever. It will therefore be seen that if the lever 52 is moved from its substantially vertical disposition illustrated in FIG. 1 and in full lines in FIG. 2, to the right or in a clockwise direction, the boat-engaging rollers 32 will move laterally outwardly and if the lever 52 is pivoted in the opposite direction, the boat-engaging rollers will move inwardly. Regardless of the motion, the two boat-engaging rollers 32 remain equi-distant from the defined central plane.

It will be observed that the mounting bracket 56 for the central lever is also formed from two tubing sections provided with simple apertures, thus to enable adjustment of its length to, in turn, accommodate such bracket to trailers of various configurations. In summary, all of the connecting elements and mounting brackets for the described structure are adjustable so that a boat-centering apparatus as specifically described can be used with a rather large range of sizes of boats and boat trailers therefor. Furthermore, the position of the pivot pin 48 can be changed on the associated arm 36 to vary the swing of the arm 36 in response to a given amount of movement of the lever 52.

In order to maintain engagement of the boat-engaging rollers 32 with the sides of a boat B during loading and also after the boat has been positioned on the boat trailer, means are provided to resiliently urge the two rollers 32 inwardly toward the sides of a boat thereon.

Preferably such means take the simple form of a coil spring 60 which is arranged in tension between the extremity of one of the connecting rods 46, that to the left as shown in both FIGS. 1 and 2, and a bracket 62 depending from the other connecting rod at an intermediate position. This spring interconnection tends to effect rotation of the central pivoted lever 52 in a counter-clockwise direction as viewed in FIG. 2 which, in turn, resiliently urges both of the connecting rods 46 inwardly to therefor pull the upstanding arms 36 inwardly together with the rollers 32 at the upper extremities of the arms. It is to be expressly noted that this spring interconnection does not interfere with the correlated motion of the boat-engaging members 30 and if, for example, the roller 32 on the left is pushed outwardly, the roller 32 on the right will be automatically forced outwardly an equivalent distance.

For purpose of explanation, it will be assumed that a boat B is to be loaded on the trailer T having the centering apparatus mounted thereon as illustrated in the drawings, such boat having a central beam dimension which is greater than that at its bow or stern. Under such conditions, the extensible connecting rods 46 are adjusted so that the boat-engaging rollers 32 are arranged to maintain contact with the boat sides adjacent its stern when the boat is fully loaded onto the trailer as shown in FIG. 1 and also as shown in full lines in FIG. 2, thus to maintain a resilient contact with the boat during its travel on the trailer.

During the loading operation, the bow of the boat B is first moved onto the support rollers 20 and the boat is moved forwardly onto the trailer whereupon its sides eventually contact the centering rollers 32 or at least one of them. If one roller 32 is contacted, it will be moved laterally outwardly but will maintain a resilient force against that side of the boat, urging the same in the opposite direction to provide an automatic resilient centering force. Since the other roller 32 is moved outwardly and the boat is off center, it will have no contact with the opposite side of the boat and will not restrict such centering motion. Since the engaged portion of the boat is usually still at least partially supported by the water, the centering force provided by the spring means need not be too great to effect the centering action and the boat B will be gradually shifted to a centered disposition over the boat trailer T. As the boat moves toward such centered disposition, both of the boat-engaging rollers 32 move inwardly equivalent amounts and when the boat is precisely centered, resilient contact will exist against both sides thereof.

Such centering contact will be maintained regardless of the instantaneous beam dimensions of the boat. For example, if the boat, as mentioned, has a greater beam dimension amidships, the rollers 32 will maintain centering contact therewith as shown in phantom lines in FIG. 2 under which conditions the central lever 52 will be angled to the right, as shown also in phantom lines in FIG. 2, and as the boat B moves further onto the trailer T and the beam dimensions narrow somewhat towards its stern portion, both rollers 32 will gradually move inwardly under the action of the spring means so as to maintain centering contact with the sides of the boat during the remainder of its loading motion onto the trailer. Thus, once contact between the rollers 32 and the sides or one side of the boat is initially instigated first a centering action will be achieved and thereafter the centered disposition will be maintained as it is moved forwardly to its final loaded disposition on the trailer. Furthermore, as mentioned hereinabove, the centering forces will be maintained even during subsequent movement of the trailer along the highway with the boat thereon.

What is claimed is:

1. Boat-centering apparatus for a boat trailer which comprises
   boat-engaging members mounted on opposite sides of the trailer for lateral movement into engagement with the sides of a boat thereon,
   means resiliently urging both of said members into boat-engaging positions, and
   means interconnecting said members to maintain the same equally distant from a predetermined central substantially-vertical plane, said interconnecting mean including a pair of connecting rods pivotally joined at their outer extremities to said boat-engaging members and at their inner ends to opposite extremities of a lever, said lever being adapted for pivotal support from the boat trailer wherefore its opposite ends move in opposite lateral directions upon pivotal motion thereof.

2. Boat-centering apparatus according to claim 1 wherein said resilient means includes a single spring connected between said connecting rods.

References Cited

UNITED STATES PATENTS

| 2,827,304 | 3/1958 | Backus | 280—143 |
| 3,021,969 | 2/1962 | Peake et al. | 280—414 X |
| 3,056,517 | 10/1962 | Trumbull | 214—84 |
| 3,083,986 | 4/1963 | Moody et al. | 214—506 X |
| 3,124,259 | 3/1964 | Goettl | 280—414 X |
| 3,178,043 | 4/1965 | Easterwood | 214—84 |
| 3,204,790 | 9/1965 | Collins | 214—84 |

LEO FRIAGLIA, *Primary Examiner*

U.S. Cl. X.R.

214—84; 280—143, 145, 414